United States Patent [19]

Kastrup et al.

[11] Patent Number: 5,149,147
[45] Date of Patent: Sep. 22, 1992

[54] CONDUIT COUPLING FOR HIGH TEMPERATURE, HIGH PRESSURE APPLICATIONS

[75] Inventors: Marie A. Kastrup, West Chester; Ivan H. Peterson, Hamilton; Bruce A. Hamblin, Cincinnati, all of Ohio

[73] Assignee: General Electric Company, Cincinnati, Ohio

[21] Appl. No.: 687,279

[22] Filed: Apr. 18, 1991

[51] Int. Cl.[5] .............................................. F16L 27/04
[52] U.S. Cl. ................................. 285/261; 285/271; 285/334.1
[58] Field of Search ............ 285/261, 265, 271, 334.1, 285/917

[56] References Cited

U.S. PATENT DOCUMENTS

| | | |
|---|---|---|
| 68,112 | 8/1867 | Rhodes . |
| 300,332 | 6/1884 | Von Schmidt ..................... 285/261 |
| 757,112 | 4/1904 | Holmes ............................. 285/271 |
| 935,412 | 9/1909 | Rust . |
| 1,041,515 | 10/1912 | Rourks . |
| 1,057,939 | 4/1913 | Cooper . |
| 1,187,642 | 6/1916 | Milz . |
| 1,913,246 | 6/1933 | Saine . |
| 1,949,055 | 2/1934 | Lambie ......................... 285/261 X |
| 2,240,078 | 4/1941 | Rader . |
| 2,457,384 | 12/1948 | Krenz ................................ 285/95 |
| 3,178,207 | 4/1965 | Fox et al. ......................... 285/165 |
| 3,276,796 | 10/1966 | Daniel ............................. 285/261 |
| 3,515,414 | 6/1970 | Kowalewski ..................... 285/165 |
| 3,544,137 | 12/1970 | Contreras et al. ................ 285/261 |
| 3,663,043 | 5/1972 | Walton ............................. 285/113 |
| 3,752,509 | 8/1973 | Stafford ........................ 285/334.4 |
| 3,874,706 | 4/1975 | Arnold ............................... 285/24 |
| 3,997,197 | 12/1976 | Marsh et al. ....................... 285/93 |
| 4,005,881 | 2/1977 | Burton et al. .................... 285/111 |
| 4,040,054 | 8/1977 | Arnold ............................... 285/18 |
| 4,103,937 | 8/1978 | Wakefield ........................ 285/110 |
| 4,171,833 | 10/1979 | Eijekelenboom ................. 285/261 |
| 4,530,526 | 7/1985 | Dopyera et al. .................. 285/261 |
| 4,647,084 | 3/1987 | Hagin et al. ................... 285/332.1 |
| 4,840,410 | 6/1989 | Welkey ............................. 285/261 |

FOREIGN PATENT DOCUMENTS

2095352 9/1982 United Kingdom ............... 285/261

Primary Examiner—Michael F. Trettel
Attorney, Agent, or Firm—Jerome C. Squillaro; John R. Rafter

[57] ABSTRACT

Conduit couplings for high temperature, high pressure applications with up to 10° misalignment capability are provided. The couplings provide a tight seal without special machining or assembly methods. The coupling comprises a spherical ball that fits within an end cap having a frustoconically shaped receptacle. A metal sealing ring positioned therebetween helps provide a tight seal that withstands pressures above 100 psi and temperatures in the range of 700°–1200° F.

18 Claims, 6 Drawing Sheets

CONDUIT COUPLING FOR HIGH TEMPERATURE, HIGH PRESSURE APPLICATIONS

BACKGROUND OF THE INVENTION

In the assembly of conduits intended for high temperature and high pressure applications, misalignment is a significant problem. Most conventional misalignment fittings are ball and socket designs intended for low pressure and/or low temperature applications, such as for underwater or subterranean pipelines. These designs do not handle misalignment in high pressure, high temperature conduit systems properly. Most conventional fittings tend to straighten the conduits and transmit the misalignment into an assembly stress. This leads to accelerated tube failures.

Misalignment fittings adapted for high pressure and/or high temperature applications have tended to result in leaks during use. In these designs, two spherically shaped surfaces are mated together by a threaded connector which surrounds the conduit and compresses the spherical surfaces when tightened. Unless the spherical surfaces are perfectly machined, this design does not seal properly. The fitting design described by Wakefield in U.S. Pat. No. 4,103,937 is an example.

Furthermore, conventional couplings adapted for high pressure and high temperature applications are difficult to assemble in limited access areas and often require special tools, as does the fitting described by Wakefield ('937).

SUMMARY OF THE INVENTION

It is an object of the present invention to provide a conduit coupling for use in high temperature, high pressure applications which provides misalignment capability without applying stress to the conduits.

It is another object of the invention to provide a conduit coupling with misalignment capability which provides a leak-proof seal at temperatures of 700° to 1200° F. and pressures above 100 psi, preferably above 500 psi.

It is another object of the invention to provide a conduit coupling with misalignment capability which is simple to manufacture and assemble.

In another aspect, it is an object of the present invention to provide coupled conduits which are leak proof at temperatures of 700° to 1200° F. and pressures of above 100 psi, and preferably above 500 psi, and are not stressed when misaligned by up to 10°.

Other objects will be apparent to those skilled in the art from the drawings, the detailed disclosure and claims presented herein.

The present invention provides a conduit coupling for high temperature, high pressure applications which comprises a hollow spherical ball, an open end cap, a retaining ring and a sealing ring. The spherical ball and open end cap are adapted to be affixed to the conduit ends to be coupled. The end cap has a frustoconically shaped inner diameter (surface) adapted to provide a receptacle for seating the spherical ball. The retaining ring is adapted to pivot about a portion of the spherical ball that extends out of the end cap. The sealing ring is adapted to be positioned between the spherical ball and the open end cap to help provide the desired seal. The retaining ring and open end cap have support means for multiple fasteners which compress said coupling components and seal the conduit once assembled.

The present invention also provides coupled conduits with the above components and multiple fasteners which compress these components and provide the desired seal.

BRIEF DESCRIPTION OF THE DRAWINGS

Various other features and attendant advantage of the present invention will be more fully appreciated as the invention becomes better understood when considered in conjunction with the accompanying drawings, in which like reference characters designate the same of similar parts throughout the several views, and wherein.

DETAILED DESCRIPTION OF THE INVENTION

The conduit coupling of the present invention is used for high temperature, high pressure applications and is sealed with multiple fasteners when assembled. It comprises a hollow spherical ball adapted to be affixed to an end of a conduit to be coupled, identified herein as a first conduit. This hollow spherical ball is preferably welded to the conduit but any method which bonds the two elements and provides a fluid-tight seal at pressures in excess of 100 psi and temperatures of 700° F.-1200° F. is suitable. This includes an interlocking thread arrangement, brazing and/or adhesives. In certain embodiments of this invention, the hollow spherical ball is formed directly from the terminal end of the first conduit by flaring and/or machining the end to an appropriate size.

The hollow spherical ball is preferably comprised of the same materials as the conduits to be coupled so as to minimize differences in thermal expansion. However, special alloys may be desired so as to improve the seal provided by the coupling. Inconel ® steel is a preferred material used in the high temperature, high pressure applications of the conduit coupling and is the preferred material of use for the hollow spherical ball.

Figures 1, 1A, 1B:
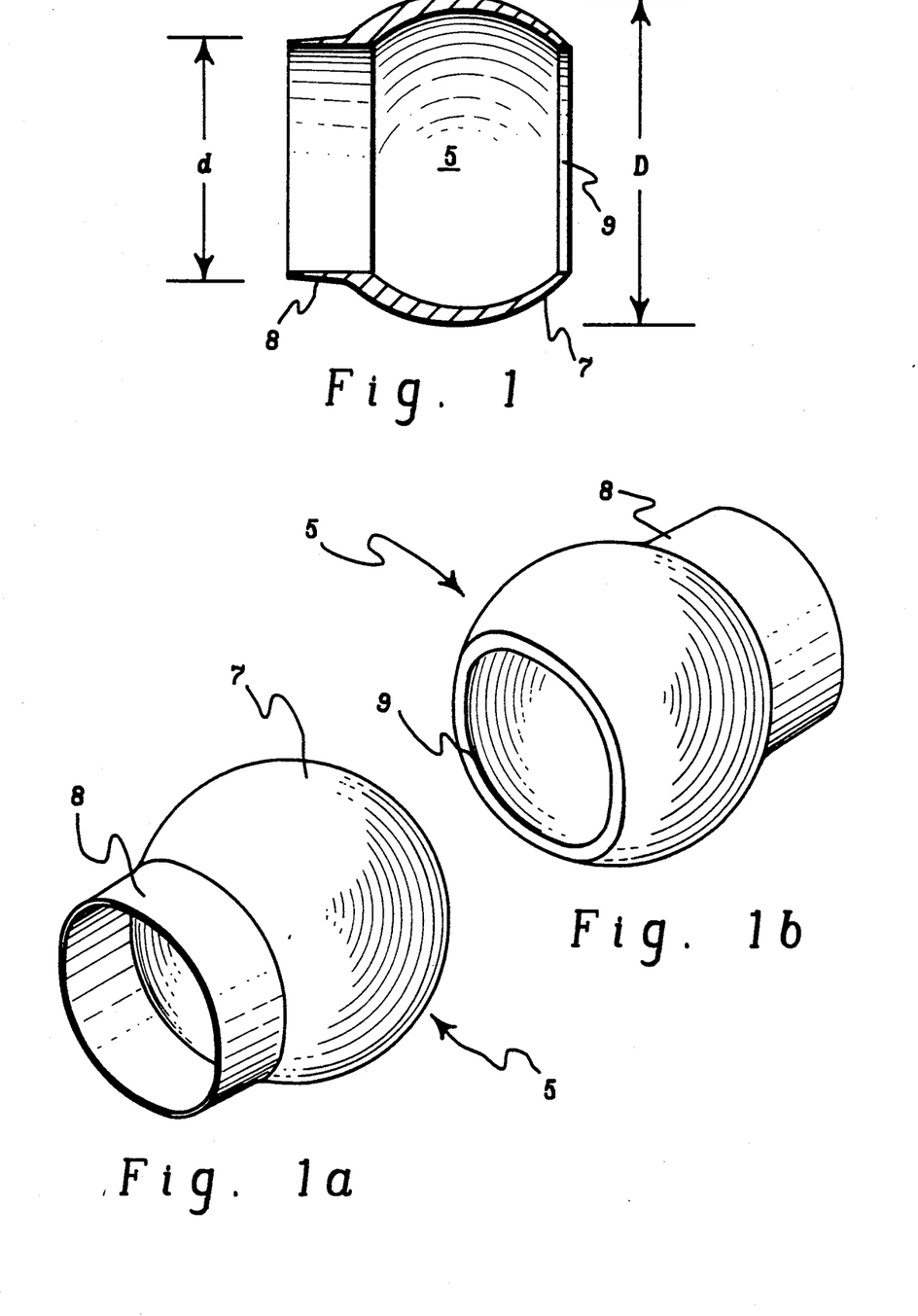
FIG. 1 is a central-longitudinal sectional view of a hollow spherical ball that forms part of the conduit coupling of the present invention.
FIG. 1a is a perspective view of the spherical ball of FIG. 1.
FIG. 1b is another perspective view of the spherical ball of FIG. 1.

Referring to FIGS. 1, 1a and 1b, a hollow spherical ball 5 that forms part of the conduit coupling is shown. Hollow spherical ball 5 has a spherical portion 7 and a tubular portion 8. Tubular portion 8 has an outer diameter adapted to permit the insertion and welding of tubular portion 8 to the open end of a conduit. Tubular 8 is preferably of a size which allows insertion in conduits ends with an outer diameter in the range of ½" to 3".

Spherical portion 7 has a central outer diameter, represented as "D" in FIG. 1, which is larger than the outer diameter of tubular portion 8 represented as "d" in FIG. 1 and the conduit in which tubular portion 8 is to be inserted. Spherical portion 7 preferably has a central outer diameter equal to at least 125% of the outer diameter of the conduit in which tubular portion 8 is to be inserted.

The larger the ratio of the spherical portion O.D.: conduit O.D., the greater the misalignment capability. However, if this ratio becomes too large, sealing the conduits, and positioning the conduits in confined areas can be difficult. The outer surface of spherical portion 7 is significant for positioning the retaining ring and for sealing hollow spherical ball 5 within the open end cap, both of which form part of the conduit coupling.

Preferably, orifice 9 of hollow spherical ball 5 does not constrict the fluid flow through the conduits. The end of the first conduit may be flared to accept a tubular portion 8 with an inner diameter that conforms to this feature.

The walls of hollow spherical ball 5 are sufficiently thick at spherical portion 7 so that they may be compressed without deformation. A wall thickness of 0.2" to 0.4" for use with a 2" conduit is suitable for handling pressures greater than 500 psi and temperatures of 700° to 1200° C.

The conduit coupling also includes an open end cap which is adapted to be affixed to an end of a conduit to be coupled, referred to herein as a second conduit. By identifying the conduits to be coupled as first and second conduits, it is not intended that the conduit coupling be excluded from joining the two ends of a single conduit.

The open end cap is preferably welded to the second conduit but the alternative bonding methods described above for the hollow spherical ball are also suitable for the end cap. In certain embodiments of this invention, the end cap is formed directly from the terminal end of the second conduit.

The open-end cap is preferably comprised of the same materials as the conduits to be coupled, which is preferably Inconel ® steel. However, special alloys may be desired for certain applications.

A critical feature of the end cap is that it has a flared frustoconically shaped inner diameter or surface which provides a receptacle for seating the hollow spherical ball. When seated within the end cap, a portion of the spherical ball should extend outside of said end cap. To ensure such a configuration, the base of the frustoconical shape for the inner surface should be wider than or about equal to the central outer diameter of the spherical ball which forms part of the coupling. The top of said frustoconical shape for the inner surface should be narrower than the central outer diameter of the spherical ball. The sides of the frustoconical shape for the inner surface have an angle of inclination within the range of 30° to 50°, most preferably 35° to 40°. This configuration coupled with the size of the spherical ball will provide the misalignment capability of the coupled conduits. The precise machining and fitting required for complementary surfaces is not necessary. However, too shallow or steep an angle of inclination will not provide a suitable seat for the spherical ball.

Another feature of the open end cap is that it provides support means for multiple fasteners which are capable of compressing the coupling components to provide a seal upon assembly. The support means is preferably a flange that extends axially from the free end of the open end cap. Most preferably, the flange contains further means for positioning the fasteners such as holes, grooves, hooks, tabs and the like.

Figure 2:
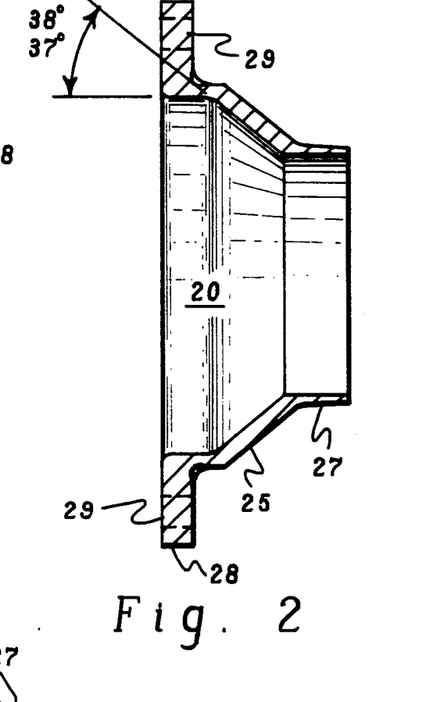
FIG. 2 is a central longitudinal sectional view of an open end cap that forms part of the conduit coupling of the present invention.
Figure 2A:
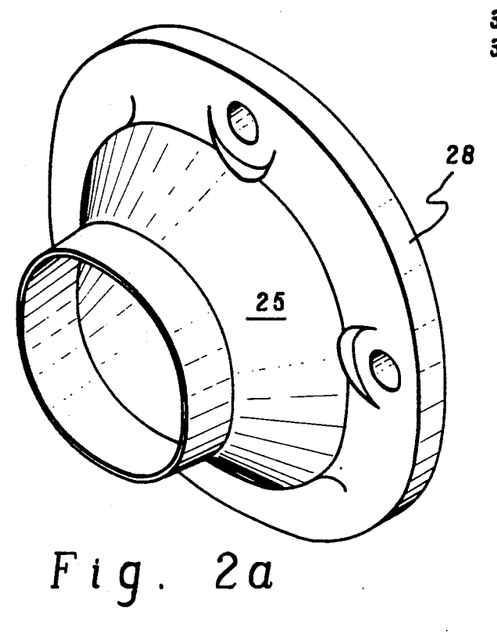
FIG. 2a is a perspective view of the open end cap of FIG. 2.
Figure 2B:
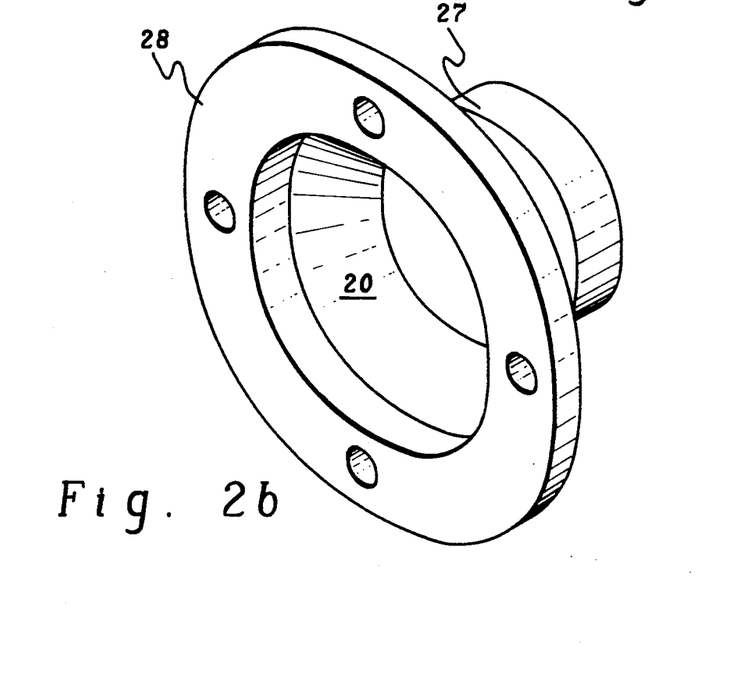
FIG. 2b is another perspective view of the open end cap of FIG. 2.

Referring to FIGS. 2, 2a and 2b, an open end cap 20 that forms part of the conduit coupling is shown. A frustoconically shaped inner diameter or surface is defined by the side walls in flared portion 25. The base is at the wide end of flared portion 25 and the top is at the narrow end of flared portion 25. The angle of inclination of the side walls in flared portion 25 is about 37°-38°. Tubular portion 27 has a tapered outer diameter to permit the insertion and welding of tubular portion 27 to the open end of a conduit.

Tubular portion 27 is preferably of a size which allows insertion in conduit ends with an outer diameter in the range of ½" to 3". Preferably, open end cap 20 will provide a receptacle for hollow spherical ball 5 of FIG. 1, wherein tubular portion 27 and tubular portion 8 of FIG. 1 can be inserted in the same conduit end, respectively.

Open end cap 20 has flange 28 with holes 29 for supporting and positioning multiple fasteners such as nut and bolt combinations. Flange 28 is of sufficient thickness to accommodate the compressive force of the fasteners without distortion as are the side walls of flanged portion 25. A wall thickness of 0.20" to 0.40" for use with a 2" conduit is suitable for handling pressures above 100 psi, most preferably above 500 psi and temperatures in the range of 700° to 1200° C.

Preferably, open end cap 20 does not constrict the fluid flow through the conduits.

The coupling of the present invention can be used with conduits having different diameters, particularly where the second conduit is larger than the first conduit.

A third element of the conduit coupling is a retaining ring adapted to pivot about the hollow spherical ball during assembly. Preferably, the retaining ring will pivot through an angle of at least 10° when positioned concentrically about the hollow spherical ball once affixed to the first conduit. All or a portion of the retaining ring has an inner diameter that is smaller than the central outer diameter of the hollow spherical ball so that the retaining ring will compress the spherical ball once the coupling is assembled. All portions of the retaining ring have an inner diameter larger than the outer diameter of the conduits to be coupled.

Preferably, the retaining ring has a hemispherically shaped inner diameter or surface that conforms to the outer diameter or surface of said spherical ball to maximize the point of contact and distribution of force once assembled. Once the coupling is assembled, the retaining ring is positioned concentrically about the portion of the spherical ball which extends outside of the open end cap.

The retaining ring also has support means for multiple fasteners which is complimentary to the support means provided by the open end cap. The support means is preferably a flange that extends axially from an end of the retaining ring. Most preferably, the flange contains further means for positioning the fasteners such as holes, grooves, hooks tabs, and the like.

The retaining ring is preferably comprised of a strong rigid material which can be the same material which forms the coupled conduits. Inconel ® steel is preferred but different alloys and/or other materials may be used for special applications.

Figures 3, 3A, 3B:
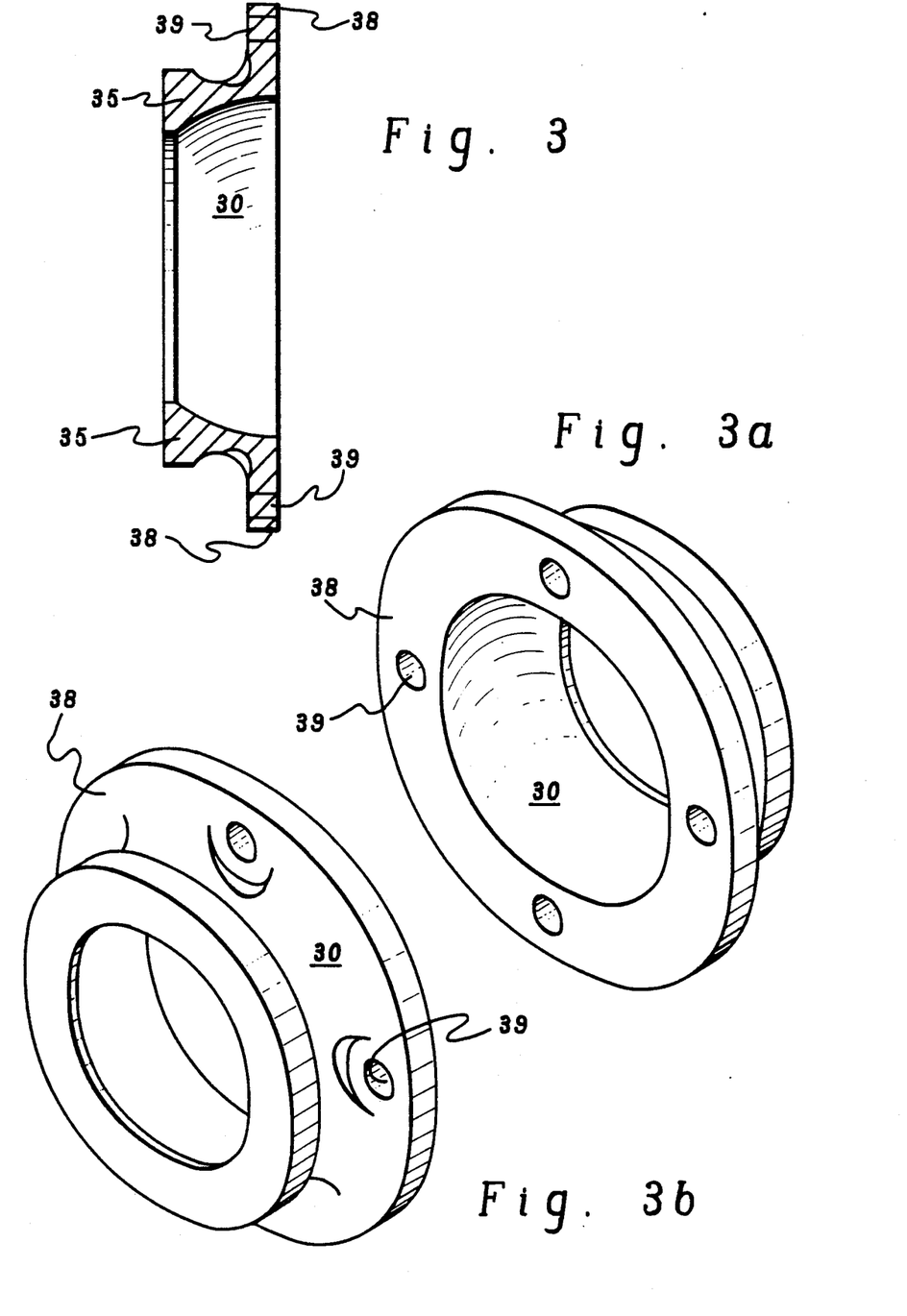
FIG. 3 is a central longitudinal sectional view of a retaining ring that forms part of the conduit coupling of the present invention.
FIG. 3a is a perspective view of the retaining ring of FIG. 3.
FIG. 3b is another perspective view of the retaining ring of FIG. 3.

Referring to FIGS. 3, 3a and 3b, a retaining ring 30 that forms part of the conduit coupling is shown. Side walls 35 define an inner diameter or surface with a hemispherical configuration which is wider at the flanged end and tapers inward. Flange 38 and holes 39 provide support for multiple fasteners such as nut and bolt combinations. Flange 38 and side walls 35 are of sufficient thickness to accommodate a compressive force that seals conduits up to 3" in diameter without distortion. Holes 39 on flange 38 will complement holes 29 on Flange 28 of end cap 20 shown in FIG. 2 when they are the same distance from center. Where holes 39 of FIG. 3 complement holes 29 of FIG. 2, and tubular portion 8 of FIG. 1 is equal to tubular portion 27 of FIG. 2, the hemispherically shaped inner surface of retaining ring 30 will preferably conform to the outer surface of hollow spherical ball 5 of FIG. 1 and will pivot at least 10° when assembled.

A fourth element of the conduit coupling can include a sealing ring that is adapted to be positioned between the hollow spherical ball and the frustoconically shaped inner surface of the open end cap. Preferably, the sealing ring has both inner and outer diameters or surfaces with hemispherical configurations which conform to the outer surface of the hollow spherical ball. In addition, the sealing ring preferably has a positioning means which aligns the sealing ring within the open end cap, such as a flange. Most preferably, the flange conforms to the flange on the open end cap.

The sealing ring can be comprised of metal so as to provide a hard point contact when compressed after the coupling is assembled. The sealing ring is deformed when compressed and can be used only once, thus increasing the contact area of the coupling. Once the fasteners are tightened, the coupling is locked in place.

Figures 4, 4A, 4B:
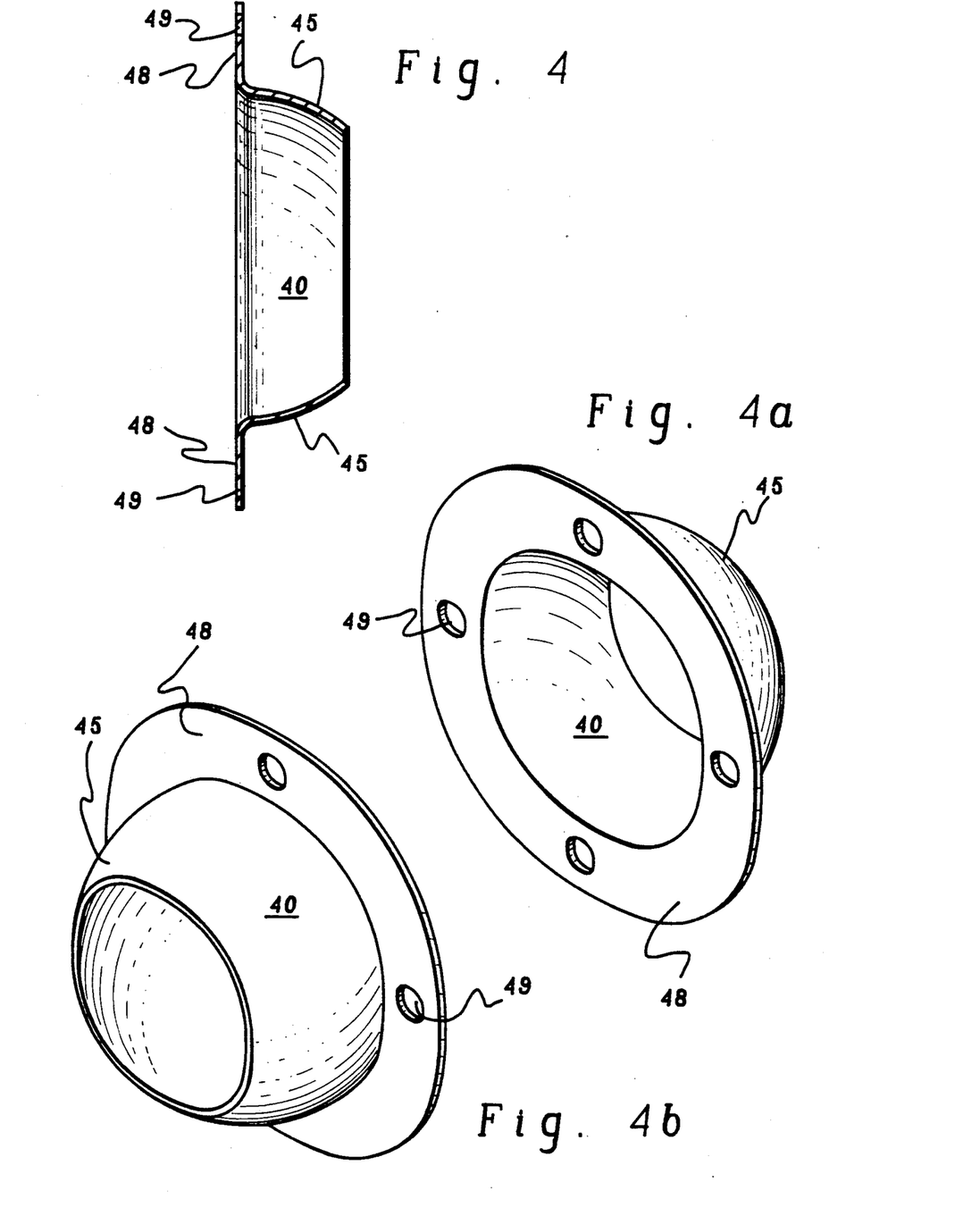
FIG. 4 is a central-longitudinal sectional view of a sealing ring that forms part of the conduit coupling of the present invention.
FIG. 4a is a perspective view of the sealing ring of FIG. 4.
FIG. 4b is another perspective view of the sealing ring of FIG. 4.

Referring to FIGS. 4, 4a and 4b, sealing ring 40, which forms part of the conduit coupling, is shown. Sealing ring 40 has thin side walls 45 which define hemispherically shaped inner and outer diameters or surfaces. Sealing ring 40 also has a flange 48 with holes 49. Where holes 49 and flange 48 conform to holes 29 and flange 28 of the open end cap in FIG. 2, the sealing ring will preferably conform to the outer surface of hollow spherical ball 5 in FIG. 1.

The conduit coupling of the present invention may also comprise fasteners which can be separate or form part of the elements of the conduit coupling. Preferably, the fasteners comprise 3 to 6 nut and bolt combinations with the bolts passing through holes 29, 39 and 49 in flanges 28, 38 and 48, respectively. However, other fasteners, such as clamps which compress flanges 28, 38 and 48, are also suitable.

Where the elements shown in FIGS. 1–4 are proportioned to provide a coupling for a conduit having an outer diameter of ½" to 3", the coupling will withstand pressures above 500 psi and temperatures of 700° to 1200° F. without leaking and without stressing the conduits when misaligned by up to 10°.

Also provided by this invention are coupled conduits for use in high pressure, high temperature environments. The coupled conduits comprise a first conduit having a hollow spherical ball extending from the coupled end and a second conduit having an open end cap extending from the coupled end. Other features and requirements of the hollow spherical ball and open end cap are as described above. Other elements of the coupled conduits include a retaining ring and sealing ring as described above and multiple fasteners.

These elements are configured so that the hollow spherical ball is seated in the open end cap with a portion of the spherical ball extending out of the end cap. The retaining ring is positioned concentrically about all or a portion of the spherical ball which extends outside of said end cap. All of the fastener support means within the coupled conduits are aligned and support the multiple fasteners. The multiple fasteners compress the hollow spherical ball, open end cap, retaining ring and sealing ring with sufficient force to deform the sealing ring and provide a seal without applying stress to the first and second conduits when misaligned by up to 10°.

Figure 5:
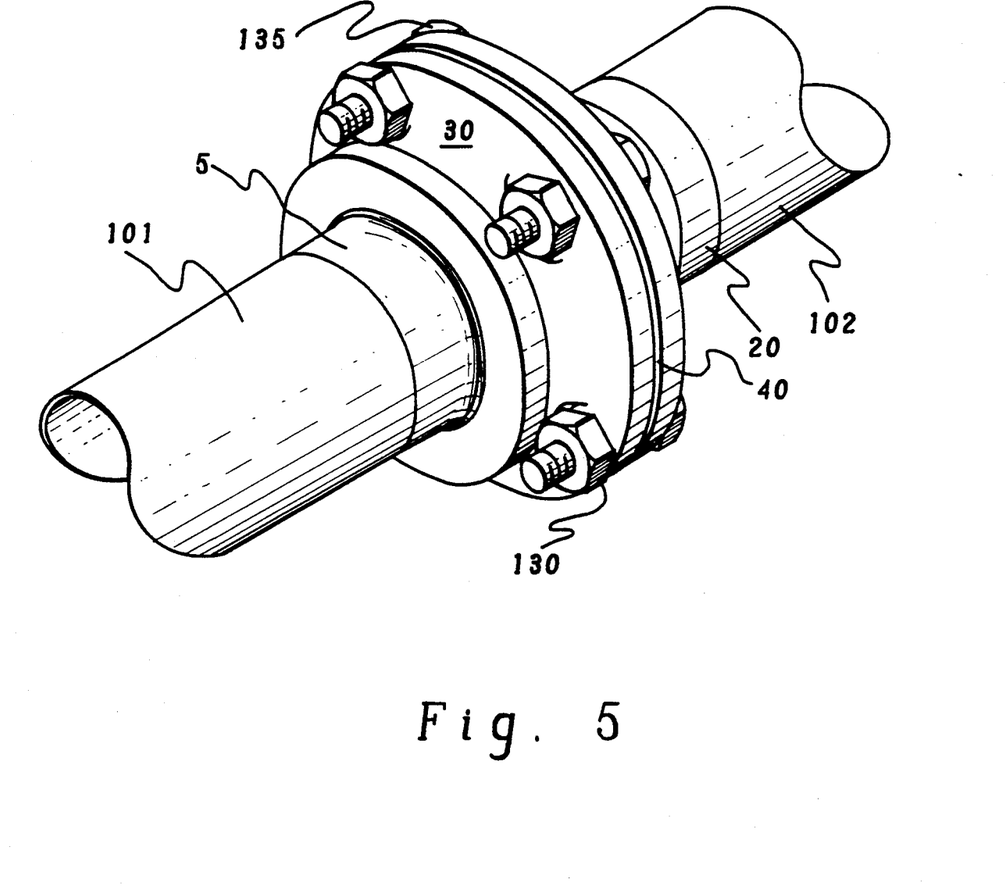
FIG. 5 is a perspective view of a coupled conduit of the present invention with the elements shown in FIGS. 1-4.
Figure 6:
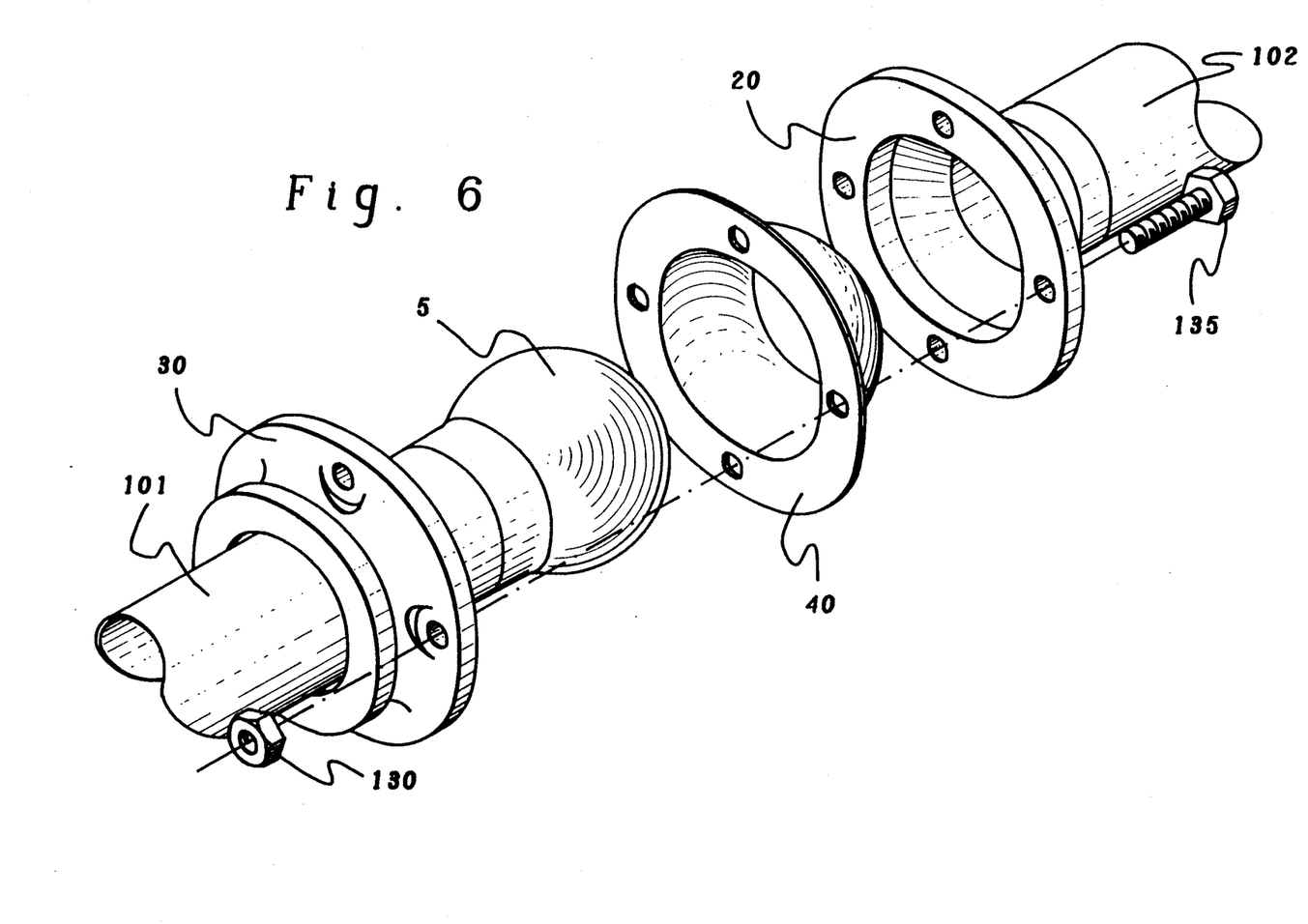
FIG. 6 is an exploded view of the coupling of FIG. 5 shown in perspective.

Referring to FIGS. 5 and 6, conduits 101 and 102 are shown coupled and in perspective in FIG. 5, and an exploded view of the coupling is shown in FIG. 6. Conduit 101 with spherical ball 5 is seated within end cap 20 of conduit 102. Retaining ring 30 is positioned concentrically about spherical ball 5 which extends out of end cap 20. Sealing ring 40 is positioned between spherical ball 5 and open end cap 20. Bolts 135 and nuts 130 compress retaining ring 30 and open end cap 20 which, in turn compress the hollow spherical ball 5 and sealing ring 40.

The couplings and coupled conduits of the present invention are well suited for use in aircraft engines where high temperature and high pressure environments are experienced and there is little tolerance for leaks or misalignment stress.

The multiple fasteners allow for easy assembly and provides a single hard point contact which is locked in place once assembled. The reactive force applied by the spherical ball to the frustoconical inner diameter of the open end cap prevents separation in use.

While the invention has been described above and illustrated by the accompanying Figures, it is recognized that the present invention is not limited to the embodiments illustrated and includes equivalents thereof.

What is claimed is:

1. A coupled conduit for high pressure, high temperature use, said coupled conduit comprising:
   a) a first conduit including
      i) an outer diameter, and
      ii) a hollow spherical ball extending from the coupled end, said spherical ball having a central outer diameter greater than the outer diameter of said first conduit,
   b) a second conduit including
      i) a longitudinal axis, and
      ii) an open end cap extending from the coupled end, said open end cap having support means for multiple fasteners and a flared frustoconically shaped inner surface having sides at an angle of inclination, relative to said longitudinal axis, in the range of 30°-50°, c) a retaining ring adapted to pivot about the hollow spherical ball during assembly, having support means for multiple fasteners which is complementary to the support means for multiple fasteners of the end cap and wherein all or a portion of the retaining ring has an inner diameter that is smaller than the central outer diameter of said spherical ball, d) a metal sealing ring having hemispherically shaped inner and outer surfaces which conform to an outer surface of the hollow spherical ball, and e) multiple fasteners; wherein:
  i) the spherical ball is seated within the flared frustoconically shaped inner surface of the end cap with a portion of the spherical ball extending outside of said end cap,
  ii) the retaining ring is positioned concentrically about a portion of the spherical ball which extends outside of said end cap,
  iii) the support means for multiple fasteners on the retaining ring and the end cap are aligned and support the multiple fasteners,
  iv) the sealing ring is positioned concentrically about the spherical ball and is compressed between the hollow spherical ball and the open end cap, and
  v) the multiple fasteners compress elements (a)-(d) with sufficient force so as to provide a hard point contact between said metal sealing ring hemispherically shaped outer surface and said open end cap flared frustoconically shaped inner surface, thereby providing a seal between the spherical ball and the end cap.

2. A coupled conduit for high pressure, high temperature use, said coupled conduit comprising:

a) a first conduit including
  i) an outer diameter, and
  ii) a hollow spherical ball extending from the coupled end, said spherical ball having a central outer diameter greater than the outer diameter of said first conduit.

b) a second conduit including
  i) a longitudinal axis, and
  ii) an open end cap extending from the coupled end, said end cap having support means for multiple fasteners and a flared frustoconically shaped inner surface having sides at an angle of inclination, relative to said longitudinal axis, in the range of 30-50 degrees.

c) a retaining ring adapted to pivot about the hollow spherical ball during assembly, having support means for multiple fasteners which is complementary to the support means for multiple fasteners of the end cap and wherein all or a portion of the retaining ring has an inner diameter that is smaller than the central outer diameter of said spherical ball.

d) a metal sealing ring having hemispherically shaped inner and outer surfaces which conform to an outer surface of the hollow spherical ball, and e) multiple fasteners; wherein:
  i) the spherical ball is seated within the flared frustoconically shaped inner surface of the end cap with a portion of the spherical ball extending outside of said end cap.
  ii) the retaining ring is positioned concentrically about a portion of the spherical ball which extends outside of said end cap.
  iii) the support means for multiple fasteners on the retaining ring and the end cap are aligned and support the multiple fasteners,
  iv) the sealing ring is positioned concentrically about the spherical ball and is compressed between the hollow spherical ball and the open end cap, and
  v) the multiple fasteners compress elements (a)-(d) with sufficient force so as to provide a seal between the spherical ball and the end cap; and f) wherein the support means for multiple fasteners of the end cap and retaining ring and the positioning means for the sealing ring each comprise a flange with 3-6 bolt holes and the multiple fasteners comprise a corresponding number of nut and bolt combinations.

3. A coupled conduit as in claim 2 wherein the first conduit and second conduits are misaligned at an angle of up to 10° without constricting fluid flow and without stressing the conduits.

4. A coupled conduit as in claim 3 which has an outer diameter in the range of ¼" to 3" and will withstand temperatures in the range of 700°-1200° F. and pressures above 100 psi.

5. A coupled conduit as in claim 2, wherein said retaining ring has a hemispherical shaped inner diameter which conforms to the outer surface of the spherical ball.

6. A coupled conduit as in claim 2, wherein there is a reactive force between the spherical ball and the flanged frustoconically shaped inner surface of the end cap.

7. A coupled conduit as in claim 2, wherein:
a) said hollow spherical ball central outer diameter divided by said first conduit outer diameter defines a ratio, wherein said ratio is a least 1.25;
b) said ratio combines with said angle of inclination to provide a misalignment capability of said coupled conduit.

8. A conduit coupling for high temperature, high pressure applications comprising:

a) a hollow spherical ball adapted to be affixed to the end of a first conduit to be coupled, said hollow spherical ball having an outer surface and a central outer diameter, wherein said first conduit includes an outer diameter, wherein the central outer diameter of said spherical ball is larger than the outer diameter of the first conduit, b) an open end cap adapted to be affixed to the end of a second conduit to be coupled, wherein said second conduit includes a longitudinal axis, said end cap having support means for multiple fasteners and a flared frustoconically shaped inner surface that provides a receptacle for seating the hollow spherical ball, wherein the base of the frustoconical shape for the inner surface is wider than or about equal to the central outer diameter of said spherical ball, the top of said frustoconical shape is narrower than the central outer diameter of said spherical ball and the sides of said frustoconical shape are at an angle of inclination, relative to said longitudinal axis, ranging from 30°-50°, c) a retaining ring adapted to pivot about the hollow spherical ball having a support means for multiple fasteners which is complementary to the support means for multiple fasteners of the end cap, and wherein all or a portion of the retaining ring has an inner diameter that is smaller than the central outer diameter of said spherical ball, and d) a metal sealing ring having hemispherically shaped inner and outer surfaces which conform to the outer surface of the hollow spherical ball, wherein the end cap and retaining ring will support fasteners that provide sufficient compressive force to provide a hard point contact between said metal sealing ring hemispherically shaped outer surface and said open end cap flared frustoconically shaped inner surface, thereby forming a seal between the spherical ball and the end cap.

9. A conduit coupling for high temperature, high pressure applications comprising:

a) a hollow spherical ball adapted to be affixed to the end of a first conduit to be coupled, said hollow spherical ball having an outer surface and a central outer diameter, wherein said first conduit includes an outer diameter, wherein the central outer diameter of said spherical ball is larger than the outer diameter of the first conduit.

b) an open end cap adapted to be affixed to the end of a second conduit to be coupled, wherein said second conduit includes a longitudinal axis, said end cap having support means for multiple fasteners and a flared frustoconically shaped inner surface that provides a receptacle for seating the hollow spherical ball, wherein the base of the frustoconical shape for the inner surface is wider than or about equal to the central outer diameter of said spherical ball, the top of said frustoconical shape is narrower than the central outer diameter of said spherical ball and the sides of said frustoconical shape are at an angle of inclination, relative to said longitudinal axis, ranging from 30-50 degrees, c) a retaining ring adapted to pivot about the hollow spherical ball having a support means for multiple fasteners which is complementary to the support means for multiple fasteners of the end cap, and wherein all or a portion of the retaining ring has an inner diameter that is smaller than the central outer diameter of said spherical ball, d) a metal sealing ring adapted to be compressed between the hollow spherical ball and the open end cap upon assembly and help provide a seal between the spherical ball and the open end cap, wherein the end cap and retaining ring will support fasteners that provide sufficient compressive force to form a seal between the spherical ball and the end cap; and e) wherein said sealing ring has (1) a hemispherically shaped inner and outer diameters or surfaces which conform to the outer diameter or surface of the spherical ball and (2) a flange with 3-6 bolt holes adapted to align the sealing ring within the end cap.

10. A conduit coupling as in claim 9, wherein the support means for multiple fasteners of the end cap and retaining ring each comprise a flange with 3-6 bolt holes.

11. A conduit coupling as in claim 9, adapted to provide a seal that will withstand pressures greater than 100 psi and temperatures in the range of 700°-1200° F.

12. A conduit coupling as in claim 11 adapted to provide a seal that will withstand pressures in the range of 100-500 psi in conduits which are misaligned by up to 10°.

13. A conduit coupling as in claim 12 wherein the hollow spherical ball and the open end cap each have tubular sections adapted for insertion in a conduit end having an outer diameter in the range of ½" to 3".

14. A conduit coupling as in claim 9, wherein the retaining ring has a hemispherically shaped inner surface which conforms to the outer surface of the spherical ball and is adapted to pivot at least 10° on the spherical ball when assembled.

15. A conduit coupling as in claim 9, wherein:

a) said hollow spherical ball central outer diameter divided by said first conduit outer diameter defines a ratio, wherein said ratio is at least 1.25;

b) said ratio combines with said angle of inclination to provide a misalignment capability of said conduit coupling.

16. A conduit coupling for high temperature, high pressure applications comprising:

a) a hollow spherical ball adapted to be affixed to the end of a first conduit to be coupled, said hollow spherical ball having an outer surface and a central outer diameter, wherein said first conduit includes an outer diameter, wherein the central outer diameter of said spherical ball is larger than the outer diameter of the first conduit, b) an open end cap adapted to be affixed to the end of a second conduit to be coupled, wherein said second conduit includes a longitudinal axis, said end cap having support means for multiple fasteners and a flared frustoconically shaped inner surface that provides a receptacle for seating the hollow spherical ball, wherein the base of the frustoconical shape for the inner surface is wider than or about equal to the central outer diameter of said spherical ball, the top of said frustoconical shape is narrower than the central outer diameter of said spherical ball and the sides of said frustoconical shape are at an angle of inclination, relative to said longitudinal axis, ranging from 30° to 50°, and c) a retaining ring adapted to pivot about the hollow spherical ball having a support means for multiple fasteners which is complementary to the support means for multiple fasteners of the end cap, and wherein all or a portion of the retaining ring has an inner diameter that is smaller than the central outer diameter of said spherical ball, and wherein the end cap and retaining ring will support fasteners that provide sufficient compressive force to form a seal between the spherical ball outer surface and the end cap flared frustoconically shaped inner surface.

17. A conduit coupling as in claim 16, wherein the retaining ring has a hemispherically shaped inner surface which conforms to the outer surface of the spherical ball and is adapted to pivot at least 10° on the spherical ball when assembled.

18. A conduit coupling as in claim 16, wherein:

a) said hollow spherical ball central outer diameter divided by said first conduit outer diameter defines a ratio, wherein said ratio is at least 1.25;

said ratio combines with said angle of inclination to provide a misalignment capability of said conduit coupling.

* * * * *